United States Patent [19]
Pardo

[11] 3,794,234
[45] Feb. 26, 1974

[54] DOUGH BATCHING MACHINE
[76] Inventor: Domingo Terren Pardo, Onteniente 7, Valencia, Spain
[22] Filed: Dec. 7, 1970
[21] Appl. No.: 95,711

[30] Foreign Application Priority Data
May 22, 1970 Spain .................................. 379968

[52] U.S. Cl. ............................................. 222/218
[51] Int. Cl. ........................ G01f 11/00, G01f 13/00
[58] Field of Search 107/4 A, 14 R, 14 B, 33, 30 R, 107/54 R, 27; 17/35–40, 12 R, 12 P, 13 R, 14 R, 30 R, 30 QM; 25/8, 11–20; 31/8, 13, 14; 72/253–255, 261; 425/110, 112, 324, 380, 246, 239, 168; 222/345, 218, 216, 217, 219

[56] References Cited
UNITED STATES PATENTS

| 3,426,705 | 2/1969 | Faerber | 425/168 |
|---|---|---|---|
| 3,558,016 | 1/1971 | Beinhofer | 222/218 |
| 1,763,487 | 6/1930 | Taylor | 222/217 |
| 1,867,998 | 7/1932 | Benson | 222/219 |
| 1,530,623 | 3/1925 | Smith | 425/239 X |
| 2,184,405 | 12/1939 | Thurlings | 107/14 R X |
| 2,810,181 | 10/1957 | Ruckstuhl | 107/14 B X |
| 2,977,632 | 4/1961 | Bunch | 107/14 R X |

FOREIGN PATENTS OR APPLICATIONS
| 674,881 | 4/1939 | Germany | 222/218 |

*Primary Examiner*—Geo. V. Larkin
*Attorney, Agent, or Firm*—Wenderoth, Lind and Ponack

[57] ABSTRACT

Means for batching bread dough wherein a vertical funnel has an outlet having a curved concave edge viewed in a direction transverse to the outlet. The edge is prolonged at least unilaterally in an arch approximately as wide as the outlet. A rotating body is coaxially disposed to the arched edge of the funnel opening and has a cylindrical cavity transverse to the axis of the body with a piston operating therein. The rotating body has a cylindrical lateral surface capable of closing the outlet. The cavity vertically aligns with the outlet and is capable of directly receiving from the funnel a quantity of dough contained therein so that it may then, upon rotation of the rotating body, deliver an amount of the dough to a point of utilization.

5 Claims, 7 Drawing Figures

DOUGH BATCHING MACHINE

BACKGROUND OF THE INVENTION

This invention relates to a dough batching machine wherein the amount of a batch of dough may be regulated and the disposition thereof controlled.

SUMMARY OF THE INVENTION

An object of the invention is to provide a bread dough batching machine having a batching device in combination with a vertical funnel whose outlet is selectively closed by a rotating drum provided with a transverse piston, such that piston movement causes an intake of dough from the funnel which is then expelled upon a later rotation of the drum to the point of use.

A further object is to provide means for batching dough by constant intake of dough upon the backward movement of a piston and thereafter regulating the advance of the piston durrotation of the drum in order that part of the dough aspirated by the piston may be returned to the funnel and the remainder delivered to the point of utilization.

A further object is to provide for the return of the dough in its totality to the funnel, or for the delivery of the total amount of dough to the point of utilization.

A further object is to afford a partial rotating movement of the drum, approximately through 90°, this movement being achieved through an eccentric and connecting rod attached to a piston rod of the piston.

A still further object is to provide for total depression of the piston while the drum is positioned precisely with the piston vertically aligned with the funnel opening, such depression of the piston being achieved by the end of an oscillating lever operated by an eccentric system.

A further object consists in regulation of the extent of the piston advance or return during the partial alternating rotating movement of the drum in order that the dough aspirated by the piston may be returned totally or in part to the funnel, or totally or in part to the point of utilization.

Therefore, batching is achieved through regulation of the advance of the piston during rotation of the drum by providing a paracentrally supported cam connected at one end of the device chassis and at the other end to a base which allows it to slide.

DETAILED DESCRIPTION OF THE INVENTION

Figure 1:
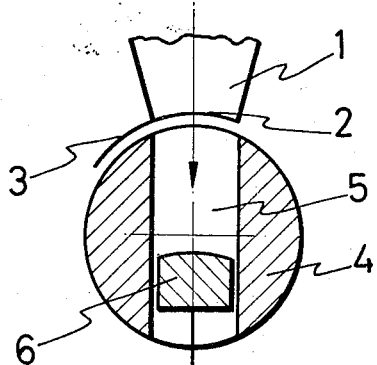
FIG. 1 is a diagrammatic view of the batching device with vertical disposition of the funnel and the rotating body or drum, the cylindrical cavity of which coincides with the funnel opening.

FIG. 1 shows the improvements introduced into a bread dough batching machine wherein the machine includes a vertically aligned funnel having an outlet 2 which is formed with a curved-concave cylindrical edge which is unilaterally extended in an arch 3 approximately as wide as that of the opening 2.

The funnel 1 is combined with a rotating clindrical body 4 located coaxially with the arched edge of the arch 3 and the opening 2. Body 4 has a cylindrical cavity 5 extending transverse to the axis thereof and wherein a piston 6 is mounted for reciprocation.

With this arrangement of elements, the piston 6 is moved downwardly and aspirates a predetermined amount of dough directly from the funnel 1.

Figure 2:
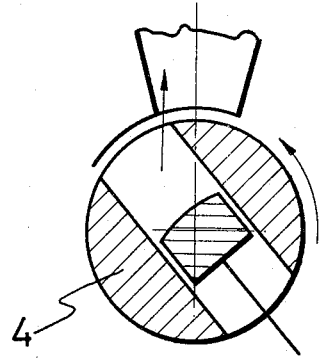
FIG. 2 shows a similar view of the batching device which shows an advance of the piston combined with partial rotation of the rotating body or drum to achieve total or partial return of the aspirated dough to the funnel.
Figure 3:
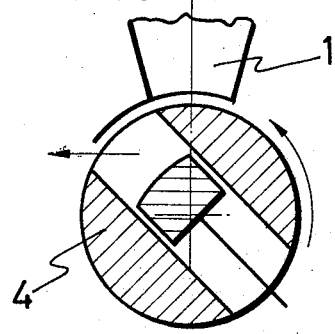
FIG. 3 is a similar view showing the further advance of the piston in the consequent rotation of the drum, to deliver the dough to the point of utilization.

Aspiration having occurred, alternating partial rotation of the rotating body or drum 4 (FIG. 2) allows that as the piston is returned upwardly, part of the dough is returned to the funnel, and following further rotation of the drum 4 (FIG. 3) dough is delivered to a point of utilization (not shown).

Figure 4:
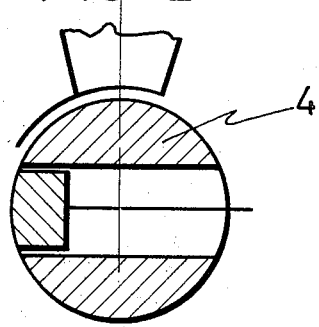
FIG. 4 is a similar view showing maximum rotation of the drum with maximum piston advance to deliver the dough to the point of utilization.
Figure 5:
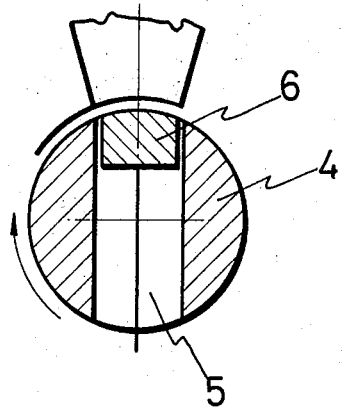
FIG. 5 is a similar view showing return of the rotating body or drum in order to repeat the aspiration cycle shown in FIG. 1.

The angle of the alternating partial rotation of drum 4 after delivery of the dough with relation to the piston 6 occurs from an approximately horizontal position (shown in FIG. 4) to a vertical position (shown in FIG. 5).

The return of the drum 4 aligns cavity 5 vertically with the outlet 2 at which time the piston 6 is ready to effect a new aspiration cycle and corresponding batching operation.

According to the above arrangement, the fundamental dough delivery process is established through the return of the piston to its vertical position (FIGS. 1 and 5) to aspirate a constant amount of dough. Advance of the piston is intended to be regulated to control the movement thereof during a determined alternating turn of the drum 4 (FIGS. 2 and 3) to achieve partial return of the dough to the funnel and the remainder to the point of utilization.

Figure 6:
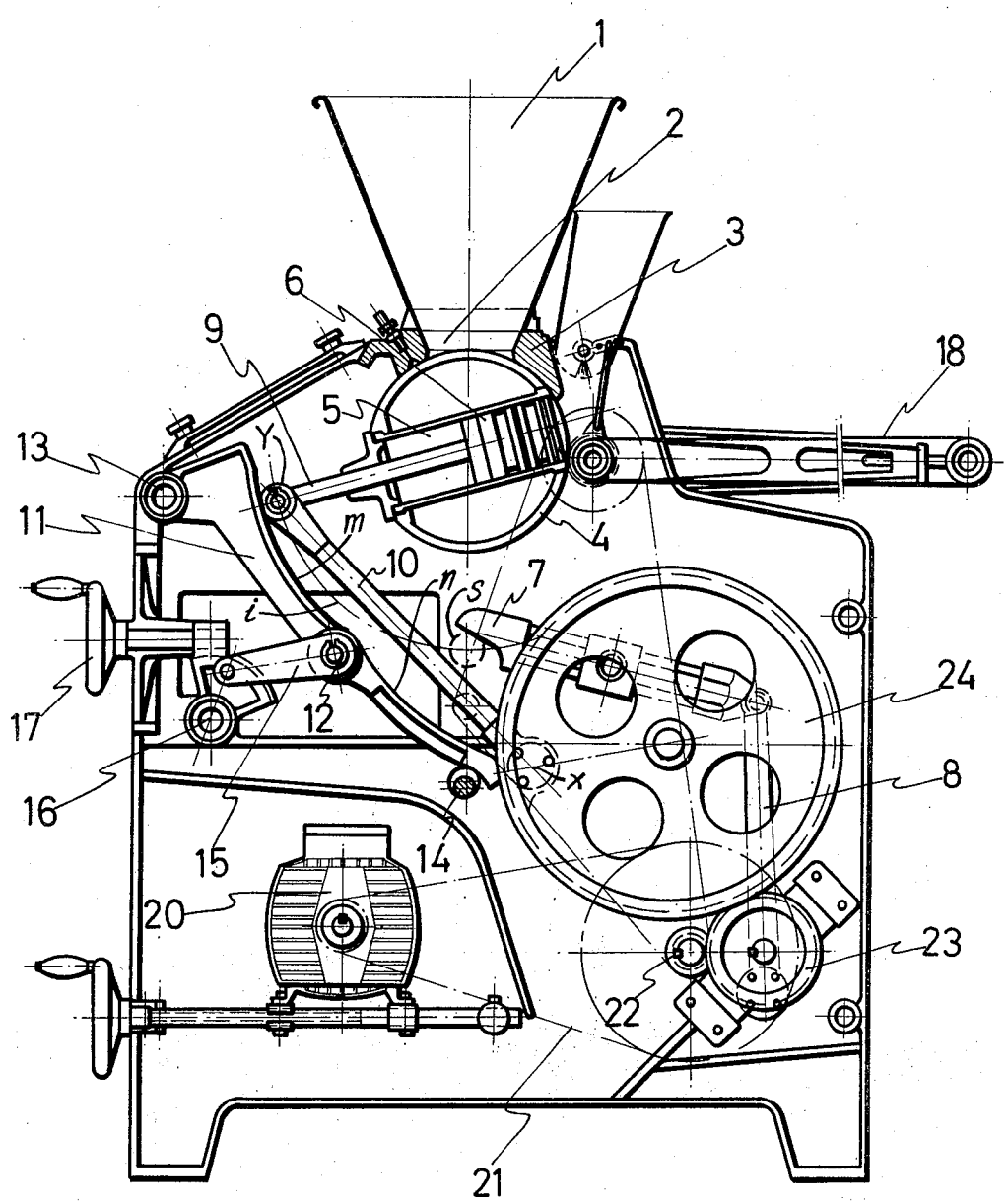
FIG. 6 is a front view, partially in cross-section, of a batching machine embracing the improvement of the present invention.
Figure 7:
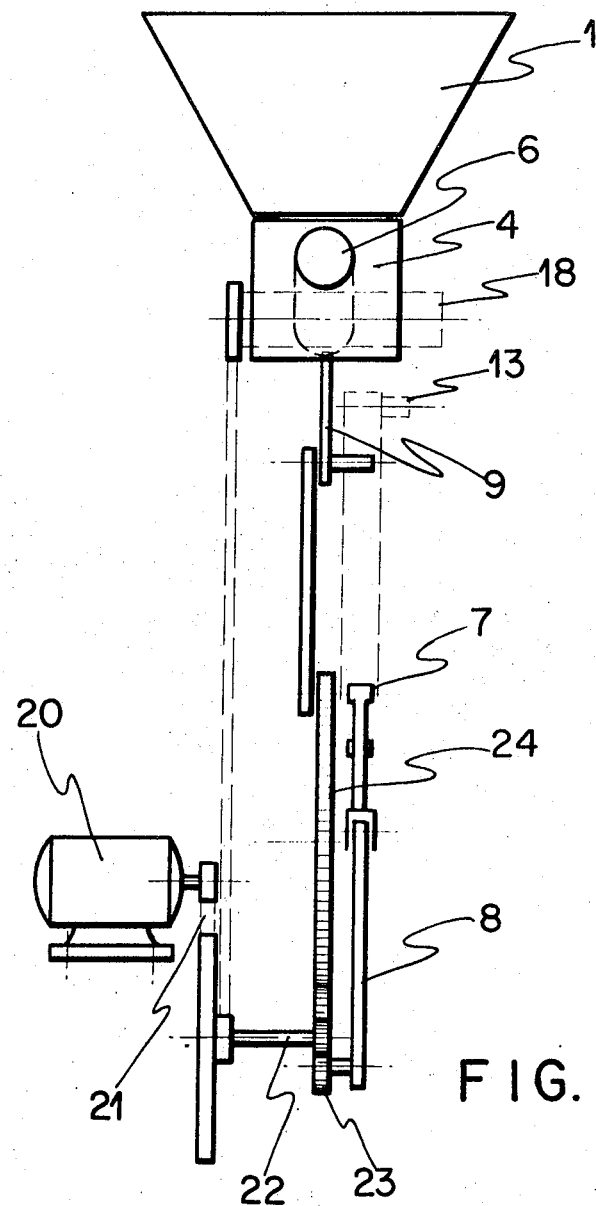
FIG. 7 is a partially schematic view taken from the right of FIG. 6.

To achieve such a batching operation, in accordance with the present invention there is provided a machine (FIGS. 6 and 7) wherein the funnel 1 is vertically located with its concave opening 2 and unilateral arch 3 coaxially aligned with the rotating body 4 or drum having the transverse cylindrical cavity 5 with piston 6 positioned therein.

Displacement or return of the piston while in the vertical position aligned with the opening 2 of the funnel is achieved by the end of a lever 7 which is activated by the connecting rod 8 of an eccentric device. The end of lever 7 contacts the end Y of a piston rod 9 of the piston 6 to move piston 6 downwardly to create aspiration of the dough from the funnel.

The alternating partial rotation of the rotating body 4 or drum is established through another eccentric mechanism connected to a connecting rod 10 attached to end Y of piston rod 9 of the piston 6.

Return of the piston 6 is achieved by the disposition of an arched cam 11 paracentrally supported at 12. One end 13 is attached to the machine chassis, while its other end may slide upon a base 14. Cam 11 has two concave arcs *m* and *n* on its cam surface. Base 14 may be a cam to achieve greater or lesser elevation of the cam 11 in relation to its central support position 12.

The postiion of paracentral support 12 of the cam 11 is regulated by a connecting rod 15 connected to a gear 16 controlled by a hand wheel 17. Thus, the disposition of cam 11 and its arcs establishes the extent of the movement of piston 6 to allow selective return of part of the dough to the funnel and the remainder to the point of utilization, ie. a conveyor belt 18 close to the drum 4.

This synchronized movement is initiated by a motor element 20 through conventional transmission means 21 such as a belt and pulley to drive a shaft 22 and thus a gear 23 having eccentrically attached thereto lever 7 for the vertical movement of piston 6. Gear 23 also transmits movement to a large gear 24 to which is eccentrically attached the connecting rod 10 which causes alternating partial rotation of the drum 4.

Thus, extreme piston movement caused by the end of lever 7 allows an intake of dough from the funnel 1 so that later, during oscillation of the drum, the end of rod 9 will be in contact with the cam 11 in order to control the extent of movement of piston 6 during rotation of the drum 4. The corresponding advance of batches is regulated by the control 17 governing the position of paracentric support 12 of the cam. The advance may be either in the first step, whereby the greater part of the dough is returned to the funnel, or to the contrary, total advance of the piston may be in the second step, whereby the greater part of the dough in the cylindrical cavity 5 of the piston is delivered to the conveyor belt 18 to the point of utilization.

The operation of the machine of the present invention will now be described. When gear 24 rotates in a counterclockwise direction point X is displaced angularly and moves, by means of rod 10, end Y downwardly. End Y rides on the surface *m* of cam 11 and thus follows the trajectory *i*.

When the surface *m* of cam 11 ends and since there is no force that can make piston 6 move downwardly, end Y does not ride on the curved surface *n* of cam 11 but on the other hand follows the trajectory *i* until it reaches point S. When this happens end Y is subjected to the action or operation of lever 7. That is on reaching point S, in which circumstance piston 6 is in a vertical position, lever 7 causes the descent of end Y until it contacts surface *n* of cam 11.

Subsequently, while gear 24 continues its rotatory movement, end Y starts to move backwardly while contacting surface *n* of cam 11, simultaneously causing the oscillating movement of drum 4 in the opposite direction and the progressive lifting of piston 6 inside cavity 5.

The lifting of piston 6 causes the returning to funnel 1 of a fraction of the dough previously aspirated. This return of dough to the funnel is repeated till end Y reaches the middle part of cam 11, or in other words the divisional point between surface *m* and surface *n* of cam 11. In this position piston 6 is substantially aligned with the prolongation of the arch 3. The amount of dough which remains up to that moment in cavity 5 is, by means of the continuous oscillating movement of drum 4, discharged onto the conveyor belt 18, while end Y contacts the surface *m* of cam 11.

It is not considered necessary to make a more detailed description in order that persons skilled in the art may understand the concept of the invention, as well as the advantages to be derived from its industrial realization which include the following:

1. A batching device based on constant aspiration of dough in one vertical position of the piston achieves regular batches of delivery through treatment of the dough wherein compression elements do not intervene.
2. A batching device wherein due to selective advance of the piston, the selective partial return of the dough to the funnel accuracy and precision in the amount of dough delivered to the point of utilization.
3. The arrangement of movement of the various parts of the batching device allow simple and uncomplicated mechanical operation, thereby eliminating maintenance and breakdowns.

I claim:

1. A bread dough batching machine comprising:
   a bread dough storage funnel having a discharge outlet in the bottom thereof, said outlet having a curved concave transverse edge, said funnel further having a curved arch constituting a continuation of said edge, the length of said arch being equal to that of said discharge opening;
   a cylindrical drum rotatably mounted co-axially of said edge, said drum having a cavity extending therethrough transverse of the axis of said drum;
   a piston mounted to reciprocate in said cavity;
   means operatively connected to said piston for moving said piston downwardly within said cavity when said cavity is vertically aligned with said discharge outlet to aspirate a batch of dough into said cavity from said funnel; and
   means operatively connected to said drum and said piston for partially rotating said drum about said axis thereof to bring said cavity out of vertical alignment with said discharge outlet, and for simultaneously returning said piston upwardly within said cavity, thereby returning a portion of said aspirated dough to said funnel and the remainder of said aspirated dough to a point of utilization.

2. A machine as claimed in claim 1, wherein said means for moving said piston downwardly comprises a piston rod connected to said piston, said piston rod having an end remote from said piston, a lever positioned to have a first end thereof contact said end of said piston rod to force said piston rod and said piston downwardly, a connecting rod operatively connected to a second end of said lever, and an eccentric operatively connected to said connecting rod.

3. A machine as claimed in claim 2, wherein said eccentric comprises a rotatable gear, said connecting rod being eccentrically attached to said rotatable gear.

4. A machine as claimed in claim 1, further comprising a piston rod connected to said piston; and wherein said means for partially rotating and for returning comprises a connecting rod attached to said piston rod, a cam having two cam surfaces, and means operatively connected to said connecting rod for moving said connecting rod in contact with said cam surfaces.

5. A machine as claimed in claim 4, further comprising a machine frame, one end of said cam being connected to said frame, the area of said cam joining said two cam surfaces having a connection, a geared sector attached to said connection, and a geared hand wheel operatively mounted to engage said geared sector, whereby rotation of said hand wheel produces a change in the angular position of said cam around the connection thereof to said frame.

* * * * *